United States Patent
Geib et al.

[11] Patent Number: 6,062,379
[45] Date of Patent: May 16, 2000

[54] CONVEYOR ASSEMBLY WITH COMPRESSIBLE LAYER

[75] Inventors: Randall R. Geib, Manheim; Michael H. Turek, Lebanon; Susan I. Trafford, Manheim; Shaun A. Seymour, II, Ephrata; Howard E. Marshall, Columbia, all of Pa.

[73] Assignee: Fenner, Inc., Manheim, Pa.

[21] Appl. No.: 09/070,093

[22] Filed: Apr. 30, 1998

[51] Int. Cl.⁷ .................................................. B65G 13/02
[52] U.S. Cl. ...................... 199/844.1; 198/690.2
[58] Field of Search ............................ 198/844.1, 846, 198/847, 850, 690.2

[56] References Cited

U.S. PATENT DOCUMENTS

| | | |
|---|---|---|
| 72,181 | 12/1867 | Fountain . |
| 1,177,664 | 4/1916 | Vuilleumier . |
| 1,182,933 | 5/1916 | Schulte . |
| 1,438,566 | 12/1922 | Wiggins ............................... 198/844.1 |
| 1,519,165 | 12/1924 | Pilliner . |
| 3,154,961 | 11/1964 | Creswell . |
| 3,288,273 | 11/1966 | Michaelson et al. .................... 198/850 |
| 3,857,478 | 12/1974 | Meeusen ............................... 198/690.2 |
| 3,991,632 | 11/1976 | Stephens . |
| 4,028,956 | 6/1977 | Thompson . |
| 4,055,265 | 10/1977 | Eisenman . |
| 4,377,365 | 3/1983 | Layh . |
| 4,925,013 | 5/1990 | Lapeyre ................................. 198/698 |
| 5,011,003 | 4/1991 | Gladding . |
| 5,361,893 | 11/1994 | Lapeyre et al. ....................... 198/690.2 |
| 5,564,558 | 10/1996 | Hampton et al. ........................ 198/850 |
| 5,853,849 | 12/1998 | Nishio et al. ............................ 198/846 |

Primary Examiner—Christopher P. Ellis
Assistant Examiner—Joe Dillon, Jr.
Attorney, Agent, or Firm—Dann, Dorfman, Herrell and Skillman; Stephen H. Eland

[57] ABSTRACT

A conveyor assembly comprising a series of belt links arranged in superimposed successive overlapping relation secured together by interlocking belt link fasteners and apertures, combined with a compressible layer to reduce the noise produced when material is placed on the conveyor assembly. The compressible layer is formed of a plurality of cushioning links that interlock with the links of the belt forming a surface which contacts the materials being conveyed.

21 Claims, 4 Drawing Sheets

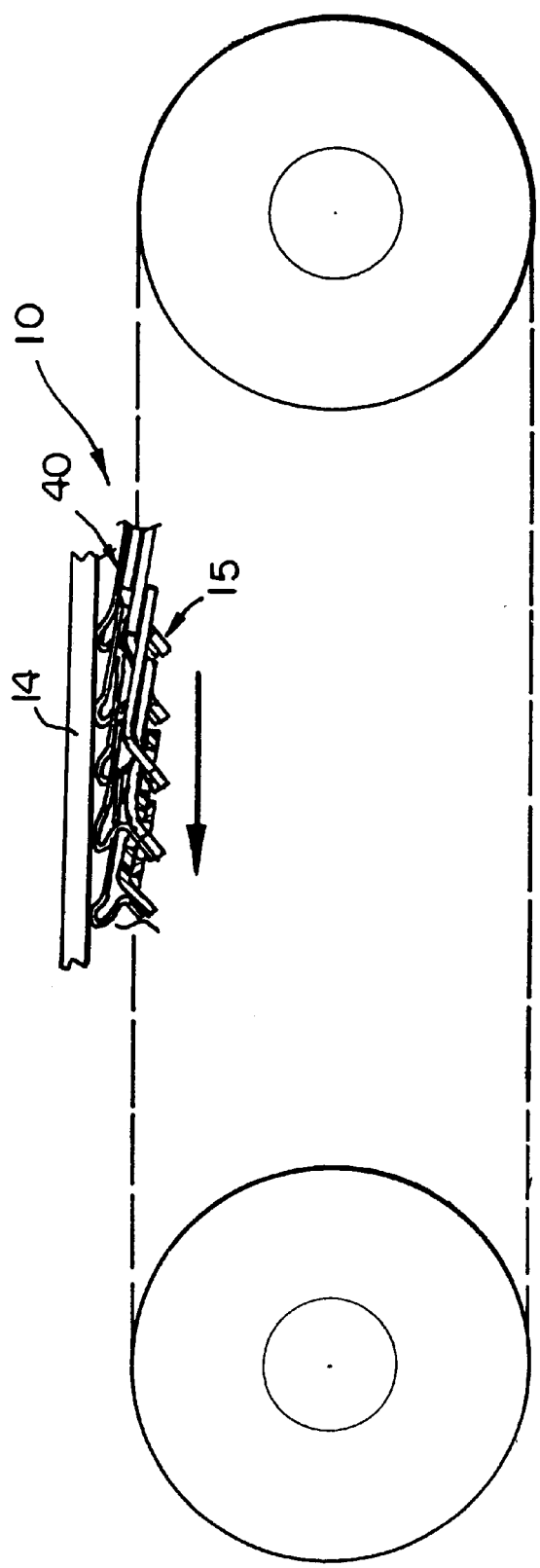
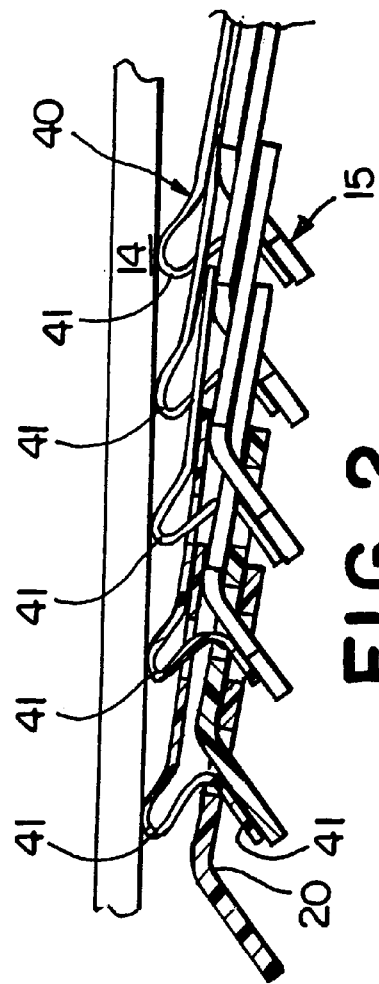

CONVEYOR ASSEMBLY WITH COMPRESSIBLE LAYER

FIELD OF THE INVENTION

The present invention relates to interlocking-link conveyor belts and has particular use in applications in which material impacts the belt thereby creating significant noise.

BACKGROUND OF THE INVENTION AND DISCUSSION OF PRIOR ART

Link belts are generally known and used in a variety of applications, such as transmission belts and conveyor belts. When used as a conveyor, frequently the material being conveyed is dropped onto the belt or manipulated so that the shock of the impact of the material onto the belt causes significant noise and/or vibration. The vibration can lead to accelerated wear of various components of the conveyor assembly. In addition, the significant noise produced by the impacting material degrades the work place environment and introduces dangers associated with high-noise environments.

SUMMARY OF THE INVENTION

The present invention provides a shock absorbing conveyor assembly comprising a continuous belt and a compressible layer. The belt is designed with sufficient tensile strength to convey the weight of the material being transported. This allows the material comprising the compressible layer to be selected without significant regard to the tensile strength of the material.

In accordance with this invention, an interlocking link belt is formed by connecting a series of belt links together so that each belt link connects with and overlaps at least one preceding belt link. A compressible layer is connected to the belt to form a shock absorbing layer operable to resiliently deform to absorb the impact of material when material is placed on the top side of the conveyor assembly.

The invention provides for a belt comprised of individual links. Each belt link has a body portion and a fastener. At least one aperture extends through each body portion. The belt links are connected by passing the fastener through the aperture in at least one preceding belt link.

The invention also provides for a shock absorbing layer connected to the links. More specifically, the shock absorbing layer is formed of a plurality of cushioning members that interlock with the belt links.

In addition, the present invention provides for a conveyor belt and a plurality of resilient elements forming a plurality of resiliently compressible pockets on the upper surface of the belt. The pockets form a conveying surface which confronts the material while the material is conveyed by the assembly. Another aspect of the invention provides that the resilient elements form a series overlapping the belt.

BRIEF DESCRIPTION OF THE DRAWINGS

FIG. 1 is a side view of an interlocking-link conveyor assembly having a compressible layer with interlocking cushioning links manifesting the present invention, shown transporting material and engaged by a driving mechanism for the assembly.

FIG. 2 is a fragmentary side view partially in section, of the assembly shown in FIG. 1.

DETAILED DESCRIPTION OF THE PREFERRED EMBODIMENTS

Figure 3:
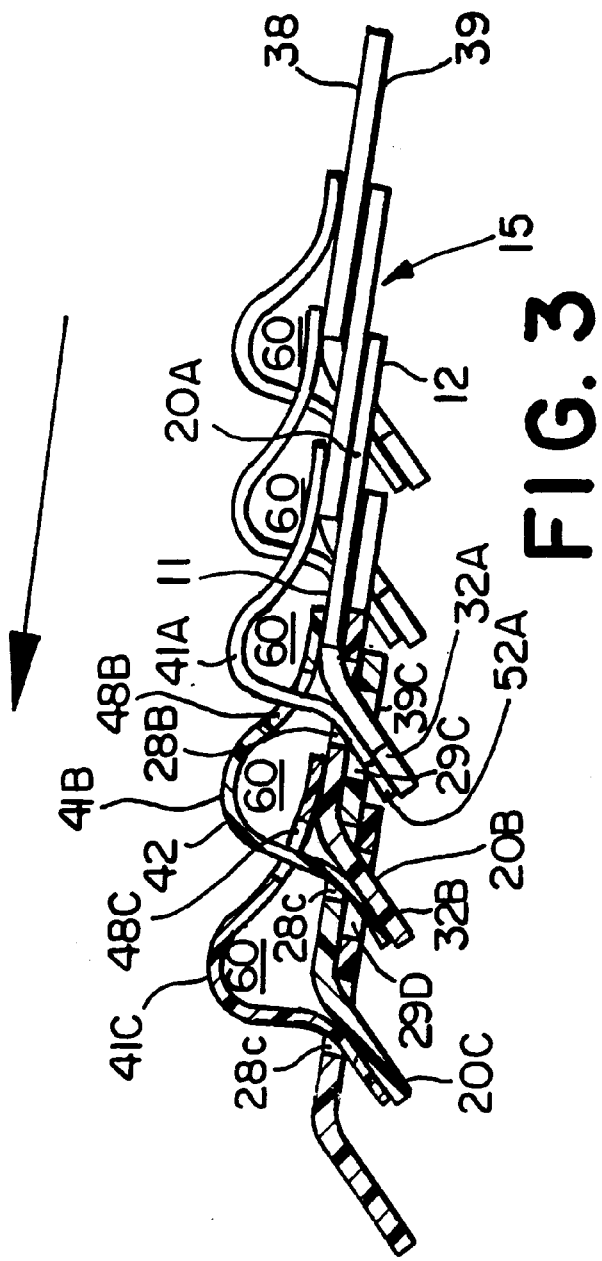
FIG. 3 is a fragmentary side elevational view partially in section of the assembly shown in FIG. 2, showing the compressible layer in a relaxed condition.
Figure 4:
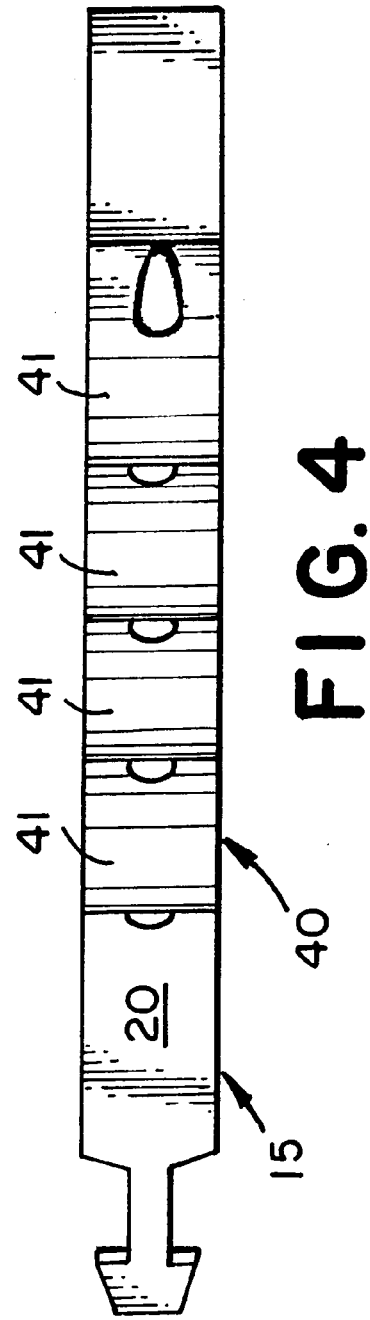
FIG. 4 is a top view of the assembly shown in FIG. 3.

Referring now to the drawings in general and FIG. 1 specifically, the preferred embodiment of a conveyor assembly comprising an interlocking-link belt 15 and an overlapping compressible layer 40 designated generally 10. The assembly 10 is shown transporting a workpiece 14. When the work piece is placed on the conveyor assembly 10, the compressible layer acts as a shock absorber to absorb the impact of the material, thereby reducing the noise produced by the impact.

Figure 5:
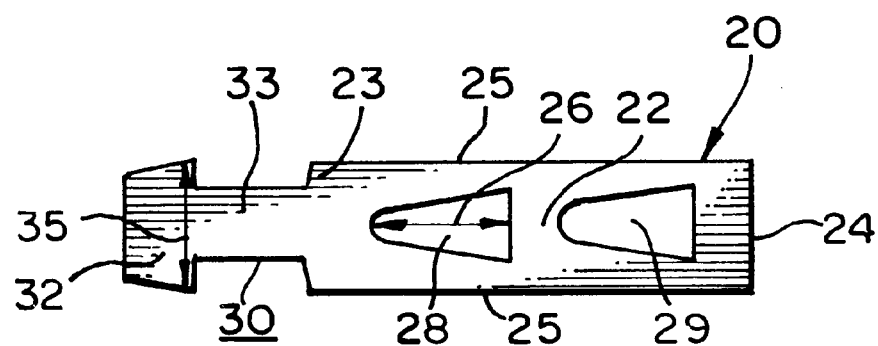
FIG. 5 is a top view of an individual link of the belt shown in FIG. 1 prior to assembly.
Figure 6:
FIG. 6 is a side view of the individual belt link shown in FIG. 2.

Referring new to FIGS. 2 and 3 the belt 15 comprises a series of interlocking belt links 20. One of the individual links 20 that comprise belt 15 is illustrated in FIGS. 5 and 6. Each belt link 20 has a body portion 22 and a fastener 30 connected to the body portion. In the present instance, the thickness of the belt link 20 between the top surface 38 and the bottom surface 39 is substantially uniform throughout the entire link.

The body portion 22 is generally rectangular, having two edges 25 extending longitudinally between a leading end 23 and a trailing end 24, both of which extend transversely between the two edges. Adjacent leading end 23 a leading aperture 28 extends through the thickness of body portion 22. Longitudinally spaced from the leading aperture 28 adjacent the trailing end 24, a trailing aperture 29 extends through the thickness of body portion 22.

The leading end 23 corresponds to the direction in which the assembly 10 travels as shown by the arrow in FIG. 1. However, the direction in which the assembly 10 travels can be reversed so that the leading end 23 does not lead the trailing end 24 with respect to the actual travel of the assembly.

The fastener 30 integrally connects the body portion 22, and comprises a fastening tab 32 and a constricted neck 33. The neck extends longitudinally, with one end connected to the fastening tab 32, and the other end connected to the leading end 23 of body 22. The length of the neck 33 between the leading end 23 and the fastening tab 32 is sufficiently long to allow the fastening tab 32 to extend through the apertures in two belt links 20 as will be further discussed below.

The fastening tab 32 is generally trapezoidal shaped, having two parallel ends that are transverse the neck 33. The fastening tab 32 is substantially wider than the neck 33, being widest at the point where it intersects the neck, and tapering as it extends away from the neck.

The belt links 20 are connected by passing the link fasteners through the apertures in adjacent belt links. To ensure that the belt links can properly connect, the apertures are configured and dimensioned with reference to the fastening tab and the neck.

In the present instance, the apertures through body 22 are non-circular. Both apertures 28 and 29 are longitudinally elongated so that their length 26 is greater than their width. To ensure that fastening tab 32 can pass through the apertures, the length of the apertures 26 is greater than the greatest width 35 of the fastening tab 32.

The width of apertures 28 and 29 is not constant. Instead, the apertures widen as they extend toward trailing end 24. To provide proper connection between the belt links 20, the apertures are narrower than the fastening tab width 35 so that the fastening tab 32 cannot pass back through the apertures once the belt links are connected. However, the apertures are wider than the neck 33 to allow the neck to extend through the apertures while the belt links are connected, as will be discussed below.

Figure 7:
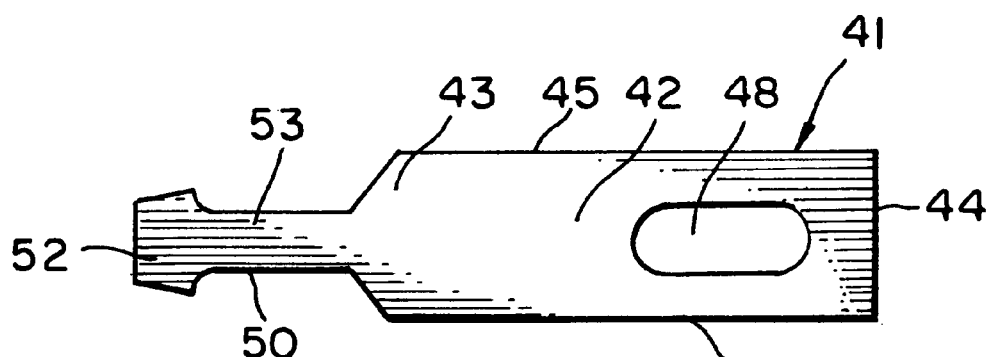
FIG. 7 is a top view of an individual cushioning link of the assembly shown in FIG. 1 prior to assembly.
Figure 8:
FIG. 8 is a side view of the individual cushioning link shown in FIG. 7.

Preferably the compressible layer 40 is comprised of a plurality of cushioning links 41 that interlock with the belt links 20. The preferred embodiment of one of the individual cushioning links 41 is illustrated in FIGS. 7 and 8. Each cushioning link 41 has a body portion 42 and a connector 50. In the present instance, the thickness of cushioning link 41 between the top surface 58 and the bottom surface 59 is of substantially uniform thickness throughout the entire link.

The cushion body portion 42 is generally rectangular, having two longitudinal edges 45 and two transverse ends, namely a leading end 43 and a trailing end 44. Remote from the leading end 43 and longitudinally-aligned with the connector 50, an aperture 48 extends through the thickness of the cushion body 42.

Adjacent the cushion leading end 43, the cushion body 42 tapers longitudinally and integrally connects with the cushion connector 50. The cushion connector 50 comprises a connector tab 52 and a constricted neck 53.

The cushion neck 53 extends longitudinally, with one end connected to the connector tab 52, and the other end connected to the leading end 43 of the cushion body 42. The length of the neck 53 between the leading end of cushion body 43 and the connector tab 52 is sufficiently long to allow the cushion connector to extend through the apertures in two belt links 20 and one cushion link 41 as will be further discussed below.

The connector tab 52 is generally trapezoidally shaped, and in this instance is smaller than the fastening tab 32 of belt link 20. The connector tab 52 is substantially wider than the cushion neck 53, being widest at the point it intersects the cushion neck, and tapering as it extends away from the cushion neck.

In the preferred embodiments, each cushion link 41 is connected to an adjacent cushion link. To ensure that the cushion links can be properly connected, the length and width of the cushion aperture 48 is determined with reference to the cushion connector tab 52 and the cushion neck 53.

In the present instance, the aperture through cushion body 42 is non-circular. The aperture 48 is longitudinally elongated so that the length is greater than the width. Additionally, to ensure that the connector tab 52 can pass though the cushion aperture 48, the length of the aperture is greater than the greatest width of the cushion connector tab 52.

To prevent the connector tab 52 from passing back through the aperture once the cushion links are connected, the width of the cushion aperture 48 is narrower than the width of the connector tab. As will be discussed below, the cushion neck 53 extends through the cushion aperture 48 while the cushion links are connected. To allow this, the cushion aperture 48 is wider than the width of the cushion neck 53.

The belt links 20 are made of a material of sufficient tensile strength to convey the weight of the workpiece 14. In the preferred embodiment, the belt links 20 are made of a urethane elastomer that is reinforced with a polyester fabric.

Because the belt links have sufficient tensile strength to convey the weight of the workpiece 14, the material used to make the cushion links can be selected for resilience and ability to dampen vibration and reduce noise without significant regard to its tensile strength. A variety of resilient elastomeric materials can be used. In the preferred embodiments, the cushion links 41 are made from thermoplastic urethane.

Additionally, preferably, the upper surface of cushion links 41 has a coefficient of friction that is at least as high as the coefficient of friction of the belt link upper surface. In the present instance, the coefficient of friction of the cushion upper surface is higher than the coefficient of friction of the belt link upper surface.

The cushion links 41 can either comprise a base material with a layer of cushioning material on the surface of the cushion link exposed to the impact of the workpiece 14, or the entire cushion link can be made from a cushioning material. In the present instance, the entire cushion link 41 is made from the same material, preferably thermoplastic urethane.

As previously stated, the assembly 10 comprises an interlocking-link belt 15 and a compressible layer 40, which are comprised of belt links 20 and cushioning links 41 that have been described above. The following discussion describes the interconnections between the belt links 20 and the cushion links 41.

As shown in FIGS. 2 and 3, a series of belt links 20 and cushioning links 41 are arranged in a superimposed successive overlapping relation to form the belt 15 with a compressible layer 40. The bottom surface 39 of each belt link overlaps the top surface 38 of an adjoining belt link, so that the thickness of the belt 15 is at least twice the thickness of an individual belt link 20.

FIG. 3 illustrates a portion of the assembly 10, showing how the cushioning layer 40 is connected to the belt 15. Included in these views is the connection between a belt link 20A, and the two preceding belt links, 20B, and 20C. In this connection, the fastening tab 32A of belt link 20A passes sideways through apertures in the two preceding belt links. It first passes through the leading aperture 28B of the adjacent preceding belt link 20B and then passes through the trailing aperture 29C of the next preceding belt link 20C.

The term preceding is used with respect to the direction the assembly travels, as shown in by the arrow in FIG. 3. Because the direction of travel can be reversed, the preceding belt links can be succeeding with respect to the actual travel of the assembly 10.

After passing through the aperture in belt link 20C, the belt link fastening tab 32A is twisted to bear against the bottom surface 39C of belt link 20C. When connected in this way, the top surface of belt link 20A is the top side 11 of belt 15, and the bottom surface 39C of belt link 20C is the bottom side 12 of belt 15.

The cushion links 41 attach to the belt 15 similar to the manner in which the belt links 20 attach to one another. FIG. 3 illustrates the connection between two cushion links 41A and 41B, and three belt links, 20A, 20B, and 20C. The connector tab 52A of cushion link 41A passes sideways through the aperture of the preceding cushion link and two belt links. It first passes through the aperture 48B of the adjacent preceding cushion link 41B, then though the leading aperture 28B of an adjacent preceding belt link 20B and finally through the trailing aperture 29C of the next preceding belt link 20C.

After passing through the aperture in belt link 20C, the cushion connector tab 52A is twisted to bear against the bottom surface 39C of belt link 20C.

As shown in FIGS. 2 and 3, each belt link 20 has a corresponding cushion link 41 attached. Preferably, the length of the cushion body 42 forward of the cushion aperture 40 is greater than the distance between the leading apertures 28B, 28C of successive belt links 20. When the cushion links are connected to the belt links, the cushion elements flex outwardly. As shown in FIG. 3, in the relaxed state, the cushioning links 41 form an aligned series of resiliently compressible pockets 60 along the outer surface of the link belt 15. Preferably, the height of the pockets 60 above the upper surface of the belt 15 is greater than twice the thickness of the link bodies 22.

As shown in FIGS. 2 and 3, the pockets 60 are hollow so that when the workpiece impacts the upper surface of the compressible layer 40, the pockets compress to absorb the shock of the material impacting the conveyor assembly 10. For instance, workpiece 14 may be dropped onto the conveyor assembly 10 or a workpiece 14 may be manipulated so that the workpiece impacts the conveyor assembly. The compressible layer 40 absorbs vibrations from the workpiece impacting the belt, and reduces the noise produced by the impacting material.

Figure 9:
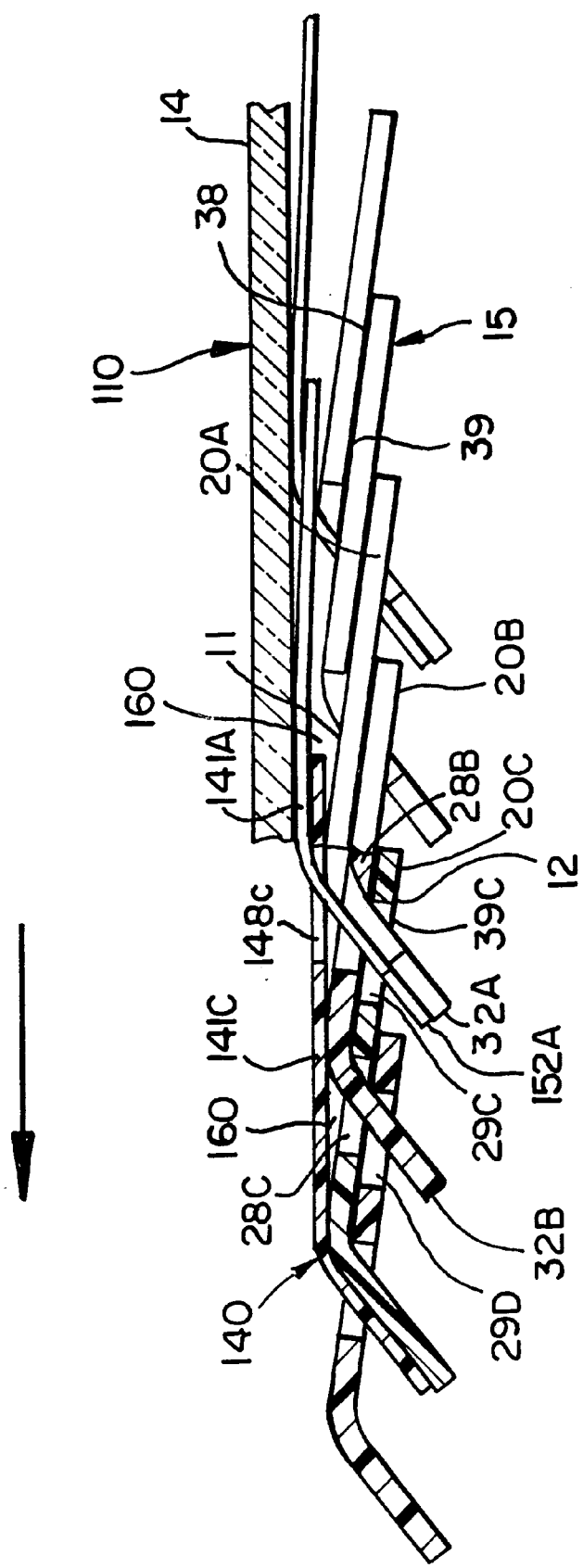
FIG. 9 is a fragmentary side view partially in section, of a second embodiment which comprises an interlocking-link conveyor assembly having a compressible layer in which the cushioning links are associated with alternating belt links.

Referring now to FIG. 9, an alternate embodiment is illustrated. The conveyor assembly 110 includes an interlocking link belt 15 that is the same as the link belt described above and illustrated in FIGS. 1–7 in connection with the first embodiment. The cushioning layer 140 is comprised of links 141 similar to the links 41 illustrated in FIGS. 7 and 8. Elements of the cushioning layer 140 that correspond to elements of the cushioning layer 40 in the first embodiment are designated with the same reference numbers in the alternate embodiment with the addition of 100's thereto.

In the alternate embodiment, the cushioning layer is comprised of a series of cushioning links 141 that interlock with the belt links 20. The cushion links 141 are associated with alternating belt links 20, rather than being associated with each belt link. In this way, a cushioning link 141C is connected to a belt link 20C so that the cushion link 141C overlaps the two successive belt links 20A, 20B in the assembly 110. A successive cushioning link 141A extends through an aperture 148C in the preceding cushioning link 141C, and engages the corresponding belt link 20A. Assembled in this manner, the cushioning link 141C forms a resilient compressible pocket 160 between the upper surface of the belt links 20B, 20C and the cushioning link 141C. The entire conveyor assembly includes a plurality of such compressible pockets 160 in an aligned series overlapping the upper surface of the link belt forming a surface for receiving the workpiece and supporting the workpiece while the conveyor assembly 110 transports the workpiece.

The terms and expressions which have been employed are used as terms of description and not of limitation. There is no intention in the use of such terms and expressions of excluding any equivalents of the features shown and described or portions thereof. It is recognized, however, that various modifications are possible within the scope of the invention as claimed.

That which is claimed is:

1. A conveyor assembly for transporting materials on the top side of the assembly comprising:

an interlocking link belt comprising a series of belt links arranged in superimposed successive overlapping relation, said belt having a thickness between its top and bottom sides corresponding to the thickness of at least two belt links, each of said belt links having:

a body portion with a lateral width, a longitudinal length, at least one aperture, and an integral fastener at the leading end of said body portion and longitudinally-aligned with said aperture, said fastener comprising:

a laterally constricted fastener neck portion; and a fastening tab connected to said body portion through said neck portion;

said belt links of said series being secured together in overlapping relation to form a belt by the neck of said fastener extending from one of said sides of the belt through said aperture in the preceding belt link, said fastening tab engaging the other of said sides of said belt at the preceding belt link to secure the belt links together; and a shock absorbing layer connected to the upper surface of the link belt, operable to resiliently deform to absorb the impact of material when material is placed on the top side of the conveyor assembly comprising a series of cushioning members each having a cushion body portion having a length positioned on the top side of the belt and an integral connector with a laterally constricted connector neck portion and a connecting tab connected to said cushion body portion through said connector neck portion;

said cushioning members being connected to said belt links by said connector neck extending through an aperture in at least one of said belt links, whereby said connecting tab is engaged on the other side of said belt, the length of said body portion being bowed outwardly from the top side of the belt to form a compressible pocket for cushioning and shock absorption.

2. A conveyor assembly according to claim 1 wherein each belt link has an associated cushioning member having an aperture, the cushioning members being connected to the belt links by the connector of each cushioning member extending through the cushioning aperture associated with the preceding cushioning member and a link aperture in at least one of the belt links.

3. A conveyor assembly according to claim 1 wherein the tensile strength of the belt links is higher than the tensile strength of the cushioning members.

4. A conveyor assembly according to claim 1, wherein the cushioning members are made of thermoplastic urethane.

5. A conveyor assembly having an interlocking link belt, comprising:

a plurality of interconnected belt links arranged in overlapping relation forming a belt having an upper surface;

a plurality of fasteners connecting adjacent belt links; and a noise reduction layer connected to the link belt operable to dampen the audible noise produced by material impacting the belt, comprising a plurality of noise reduction elements each having at least one end connected to the belt and having a portion overlapping the upper surface of the belt and bowed outwardly therefrom forming a noise-reducing pocket between said bowed out portion and said upper surface.

6. A conveyor assembly according to claim 5 comprising a plurality of noise reduction fasteners operable to interlock the noise reduction elements with the belt links.

7. A conveyor assembly according to claim 6 wherein each of the noise reduction elements includes an aperture and one of said plurality of noise reduction fasteners, each belt link includes an aperture, and said noise reduction fastener of each element extends through the aperture of an associated belt link and the aperture of the preceding noise reduction element to fasten each noise reduction element to the corresponding belt link and the preceding noise reduction element.

8. A conveyor assembly according to claim 5 wherein the plurality of noise reduction elements are connected in series in overlapping relation overlying the belt links.

9. A conveyor assembly according to claim 8 wherein said bowed out body portion has an upper surface with a coefficient of friction higher than the coefficient of friction of the upper surface of the belt links.

10. A conveyor assembly according to claim 8 wherein the tensile strength of the belt links is higher than the tensile strength of the noise reduction elements.

11. A conveyor assembly according to claim 8 wherein the noise reduction elements are made of thermoplastic urethane.

12. A conveyor assembly according to claim 8 wherein each belt link is connected to a corresponding noise reduction element in the series so that the number of noise reduction elements is substantially the same as the number of belt links.

13. A conveyor assembly according to claim 8 wherein the bowed out body portion of the noise reduction elements are spaced above the upper surface of the belt, forming a series of compressible hollow pockets.

14. A conveyor assembly according to claim 13 wherein the belt links comprise a body portion having a thickness and the bowed out body portion of the hollow pockets have a maximum spacing from the upper surface of the belt more than twice the thickness of the belt link portion.

15. A conveyor assembly for conveying material, comprising:
   a belt having a continuous length with an upper surface; and
   a plurality of flexible elements having a body portion with a length having leading and trailing ends, and extending along the continuous length of the belt between said leading and trailing ends, said ends being connected to the belt at points which are longitudinally spaced by a distance less than the length of the body portion, causing the body portion to flex and bow outwardly, forming a series of resiliently compressible pockets outwardly of the upper surface of the belt to dampen audible noise.

16. A conveyor assembly according to claim 15 wherein the plurality of elements are connected in series in overlapping relation overlying the belt.

17. A conveyor assembly according to claim 15 comprising a plurality f fasteners operable to connect the plurality of elements with the belt, each body portion having a one of said fasteners at one of the leading and trailing ends, and a receptacle at the other of the leading and trailing ends to receive the fastener of an adjacent body portion in said series.

18. The conveyor assembly of claim 15 wherein the coefficient of friction of the upper surface of the plurality of elements is higher than the coefficient of friction of the upper surface of the belt.

19. The conveyor assembly of claim 15 wherein the tensile strength of the belt is higher than the tensile strength of the plurality of elements.

20. The conveyor assembly of claim 15 wherein the plurality of elements are made of thermoplastic urethane.

21. The conveyor assembly of claim 15 wherein the belt is made of a material having a thickness and the thickness of the pocket formed between the bowed body portion and the belt upper surface is at least twice the belt material thickness.

* * * * *